(12) United States Patent
Pavot et al.

(10) Patent No.: US 9,386,090 B2
(45) Date of Patent: Jul. 5, 2016

(54) DEVICE AND METHOD FOR RECEIVING SCALABLE CONTENT FROM MULTIPLE SOURCES HAVING DIFFERENT CONTENT QUALITY

(75) Inventors: Christophe Pavot, Haute-Garonne (FR); Francois-Xavier Ehrhart, Aquitaine (FR); Thomas Papin, Haute-Garonne (FR)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 1599 days.

(21) Appl. No.: 12/646,299

(22) Filed: Dec. 23, 2009

(65) Prior Publication Data

US 2010/0169414 A1 Jul. 1, 2010

(30) Foreign Application Priority Data

Dec. 31, 2008 (EP) .................................... 08306030

(51) Int. Cl.
*G06F 15/16* (2006.01)
*H04L 29/08* (2006.01)
*H04N 21/4402* (2011.01)
*H04N 21/462* (2011.01)
*H04N 21/63* (2011.01)
(Continued)

(52) U.S. Cl.
CPC .......... *H04L 67/104* (2013.01); *H04L 65/4084* (2013.01); *H04L 65/80* (2013.01); *H04L 67/108* (2013.01); *H04L 67/1095* (2013.01); *H04N 21/44029* (2013.01); *H04N 21/4621* (2013.01); *H04N 21/4622* (2013.01); *H04N 21/632* (2013.01); *H04N 21/64792* (2013.01)

(58) Field of Classification Search
USPC ......................................................... 709/203
See application file for complete search history.

(56) References Cited

U.S. PATENT DOCUMENTS

| 6,973,475 B2 | 12/2005 | Kenyon et al. |
| 7,953,882 B2 * | 5/2011 | Shukla et al. ................. 709/231 |
| 7,991,003 B2 * | 8/2011 | Hamanaka .................... 370/468 |

(Continued)

FOREIGN PATENT DOCUMENTS

| EP | 1643716 A1 | 4/2006 |
| WO | 2005109827 A1 | 11/2005 |
| WO | 2006017099 A1 | 2/2006 |

OTHER PUBLICATIONS

EPC Search Report; EPC Application No. EP08306030, corresponding Motorola; Jul. 9, 2009; 8 pages.

(Continued)

*Primary Examiner* — Ario Etienne
*Assistant Examiner* — Blake Rubin

(57) ABSTRACT

A device and a method in a device for receiving scalable content. The method includes receiving a first portion of content to be received with a desired content quality from a first source having a first version of the receivable content. A second portion of content to be received with a desired content quality is received from a second source having a second version of the receivable content, where a value for at least one quality factor of the second version of the receivable content is different than a value for the corresponding quality factor of the first version of the receivable content. At least the first portion of content to be received and the second portion of content to be received is then combined, wherein at least one of the first version and the second version includes non-duplicative data.

19 Claims, 4 Drawing Sheets

(51) Int. Cl.
*H04N 21/647* (2011.01)
*H04L 29/06* (2006.01)

(56) References Cited

U.S. PATENT DOCUMENTS

| | | | | |
|---|---|---|---|---|
| 8,014,403 | B2* | 9/2011 | Amonou et al. | 370/395.21 |
| 2003/0233464 | A1* | 12/2003 | Walpole et al. | 709/231 |
| 2006/0047779 | A1 | 3/2006 | Deshpande | |
| 2006/0053209 | A1 | 3/2006 | Li | |
| 2006/0184688 | A1* | 8/2006 | Ganguly et al. | 709/232 |
| 2008/0068446 | A1* | 3/2008 | Barkley et al. | 348/14.07 |
| 2009/0030976 | A1* | 1/2009 | Shukla et al. | 709/203 |
| 2009/0031038 | A1* | 1/2009 | Shukla et al. | 709/231 |
| 2009/0034614 | A1* | 2/2009 | Liu et al. | 375/240.11 |
| 2009/0077254 | A1* | 3/2009 | Darcie et al. | 709/231 |
| 2009/0252219 | A1* | 10/2009 | Chen et al. | 375/240.02 |
| 2010/0217887 | A1* | 8/2010 | Bouazizi et al. | 709/231 |

OTHER PUBLICATIONS

Zink et al.; P2P Streaming Using Multiple description Coded Video; Euromicro'04; XP10723597A; 8 pages.

Nemati et al.; A Multi-Source Streaming Model for Mobile Peer-to-Peer (P2P) Overlay Networks; ICDCS Workshops 2008; XP31290724; 6 pages.

Rejaie et al.; PALS: Peer-to-Peer Adaptive Layered Streaming; XP002535836; 10 pages.

Mushtaq et al.; "P2P-based Collaborative Media Streaming for Heterogeneous Network Terminals" 2008 IEEE; XP31296106; 6 pages.

* cited by examiner

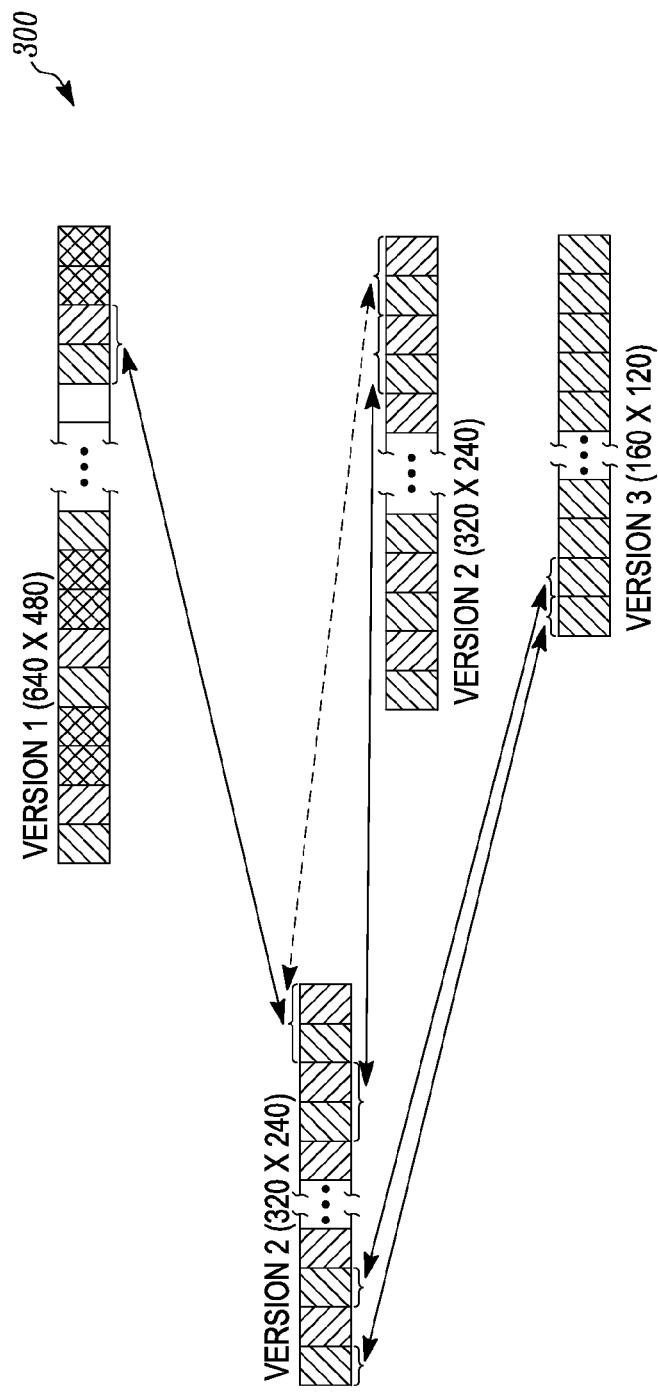

DEVICE AND METHOD FOR RECEIVING SCALABLE CONTENT FROM MULTIPLE SOURCES HAVING DIFFERENT CONTENT QUALITY

FIELD OF THE INVENTION

The present invention relates generally to receiving content including combinable portions from multiple sources, and more particularly, to the receipt of scalable content combined from multiple sources having different versions of the content, where a value for at least one quality factor for the respective versions associated with the multiple sources is different.

BACKGROUND OF THE INVENTION

File sharing refers to the provision for sharing (receiving or distributing) digital files and/or content via a network. In many cases the file sharing involves a peer to peer connection, where content is at least partially received from one or more other end users of the content, which already possess a copy of the desired content. Such a distribution model differs from other instances in which a central server maintains and distributes the content. The peer to peer model benefits from the advantages of a more distributed distribution approach, where a larger number of sources of the content, each having an independent ability to source the content including processing power and distribution bandwidth, are used to supply one or more portions of the content. A particular content recipient can receive different portions of the content from separate sources, which helps to minimize and/or spread the load or impact on any particular source of the content.

Furthermore the presence of multiple sources serves to provide a degree of redundancy, which can be used to accommodate the dynamic nature of networks, such as the Internet, where any particular source's presence on the network may be temporary and/or transient. If a particular source ceases to be available during the download of content, another suitable source is identified and accessed to supply the remaining portions of the content that has yet to be received.

Such a distribution model for content has become very popular for use on personal computers. As such, much of the available content via this distribution model is formatted for use in that environment. Increasingly, users are wanting to access the same or similar content using more portable devices, such as personal digital assistants or cellular telephones. However, much of the available content is formatted for being viewed on the relatively higher fidelity interfaces more commonly associated with personal computers. Additionally, the more limited storage associated with the more mobile devices has diminished the availability of content formatted at a quality level that is suitable for rendering by the more mobile devices.

In some instances the ability to more readily scale content has benefited from the increasing availability of scalable codecs for audio, image or video files, which can sometimes be more readily used to change the quality of the file by adapting the dimensions, the frame rate, and/or other quality factors of the content, without first needing to decompress the information, and subsequently recompress the information after the appropriate quality conversion. At least a couple of scalable techniques include bitplane coding and enhancement layer encoding, which assists in making available a desired portion associated with a particular quality level.

In bitplane coding, scalable coding of the media blocks is generally achieved by coding a block of audio/video transform coefficients bitplane by bitplane, from the most significant bitplane to the least significant bitplane.

In enhancement layer encoding, the media content is compressed into a base layer and one or more enhancement layers, each of which typically occupies a separate channel. A minimum quality media stream is coded in the base layer. With the addition of each successive enhancement layer in addition to the base layer, the quality of the decoded media improves.

However even with the availability of scalable codecs, many peer to peer applications have difficulty managing multiple source files of the same content having differing versions of quality, as the more traditional peer to peer models, are unable to establish a useable relationship between the different versions of the same content. In absence of being able to recognize a useable relationship between the different versions, the different versions are treated by many peer to peer distribution systems as being separate independent and distinct forms of content.

Consequently, the present inventors have recognized that it would be beneficial if the content that is readily available in differing quality levels from multiple peer sources might be identified and adapted to be received and combined at a suitable quality level for use on a more mobile device having greater limitations on data throughput as well as the reproducible quality levels for content that is intended to be rendered by the device.

SUMMARY OF THE INVENTION

The present invention provides a method in a device for receiving scalable content. The method includes receiving a first portion of content to be received with a desired content quality from a first source having a first version of the receivable content. A second portion of content to be received with a desired content quality is received from a second source having a second version of the receivable content, where a value for at least one quality factor of the second version of the receivable content is different than a value for the corresponding quality factor of the first version of the receivable content. At least the first portion of content to be received and the second portion of content to be received is then combined, wherein at least one of the first version and the second version includes non-duplicative data.

In at least one embodiment, at least one of the first version of the receivable content and the second version of the receivable content has a value for at least one quality factor, which is different from the desired value of the corresponding quality factor of the content to be received with the desired content quality.

In at least a further embodiment, the method further includes receiving by the device for receiving scalable content a list of the usable portions of at least one of the first version of the receivable content and the second version of the receivable content in forming the content to be received with the desired content quality.

In at least a still further embodiment, the method further includes receiving by the device for receiving scalable content a list of error checking values for each of one or more different portions of the content to be received with the desired content quality for validating the integrity of the received content after combining.

The present invention further provides a device for receiving scalable content in a system including at least a first source having a first version of the receivable content and a second source having a second version of the receivable content, where a value for at least one quality factor of the second version of the receivable content is different than a value for the corresponding quality factor of the first version of the receivable content. The device includes a receiver for receiving a first portion of content to be received with a desired content quality from the first source, and a second portion of content to be received with a desired content quality from the second source. The device further includes a controller for combining at least the first portion of content to be received and the second portion of content to be received, wherein at least one of the first version and the second version includes non-duplicative data.

These and other features, and advantages of this invention are evident from the following description of one or more preferred embodiments of this invention, with reference to the accompanying drawings.

BRIEF DESCRIPTION OF THE DRAWINGS

FIG. 3 is a block diagram of a mapping of usable blocks of different versions of the same content, including a version having a higher quality and a version having a lower quality;

FIG. 4 is an exemplary command structure for requesting one or more blocks of data from a source of receivable content as part of a single request;

DETAILED DESCRIPTION OF THE PREFERRED EMBODIMENT(S)

Figure 1:
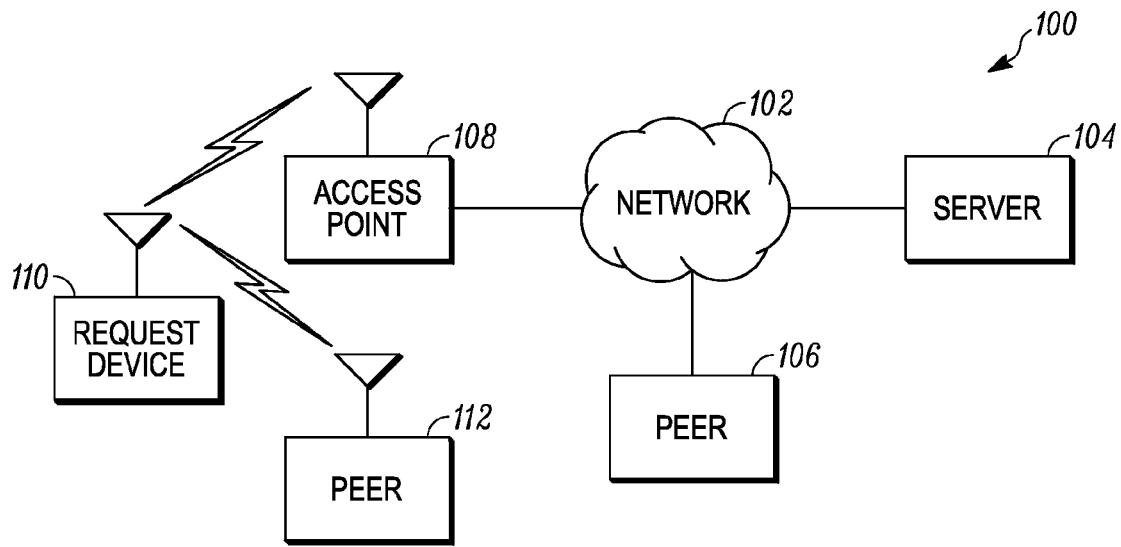
FIG. 1 is a block diagram of at least a portion of an exemplary network environment in which the distribution of content from multiple sources can occur.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

FIG. 1 illustrates a block diagram 100 of at least a portion of an exemplary network environment in which the distribution of content from multiple sources can occur. In the illustrated embodiment, network 102 represents connectivity that can be present between entities such as servers 104, peer devices 106 and access points 108, which can be used to interface with other devices either directly or indirectly connected to the network 102. Through the access point 108, a device 110 that is requesting content can communicate with other entities communicatively connected to the network 102. It is further possible that the device 110 that is requesting content can communicate directly with other peer devices 112 independent of the network 102.

In at least some instances, the network 102 can include elements associated with one or more types of networks, some of which are intended to interact with the device that is requesting the content or the one or more entities from which the content is sought. In at least some instances, the network 102 may include elements commonly associated with a packet data network, such as the Internet. In the same or other instances, the network 102 may include elements commonly associated with a wireless communication system, such as a wireless LAN or a wireless cellular telephone system. Correspondingly, in at least some instances, the access point 108 might be a wireless router, or a cellular base station, through which other elements coupled to the network can be accessed, including content providers such as servers 104 or peer devices 106. One skilled in the art will readily appreciate, that the network 102 could represent and/or include still further forms of network elements, such as a wireline circuit switched telephone system, and/or other types of networks, without departing from the teachings of the present invention.

Figure 2:
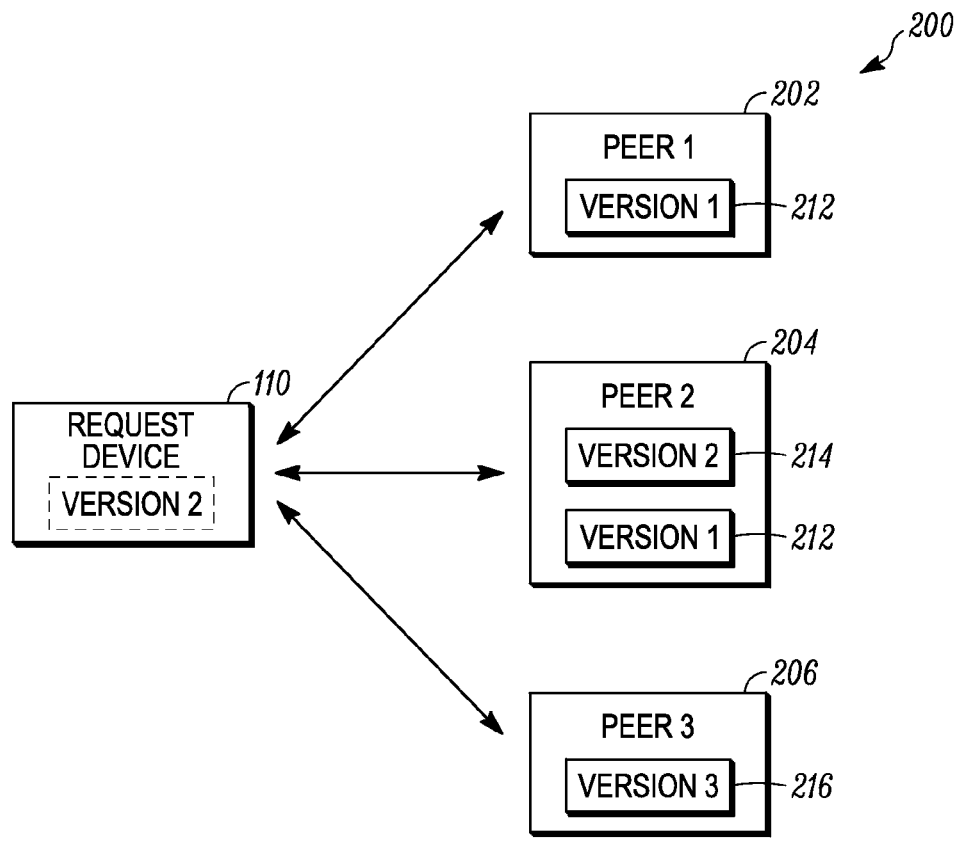
FIG. 2 is a block diagram of a requestor device and multiple peer devices each having different versions of the same content.

FIG. 2 illustrates a block diagram 200 of a requestor device 110 and multiple peer devices each having different versions of the same content. The requestor device 110 is able to access either directly or indirectly one or more peer devices 202, 204 and 206, each including one or more different versions of the desired content 212, 214 and 216. In the illustrated embodiment, a first peer device 202 includes a copy of a first version 212 of requested content. Further, a second peer device 204 includes a copy of both the first version 212 and a second version 214 of the requested content. Lastly, a third peer device 206 includes a copy of a third version 216 of the requested content. Generally each different version differs from the other versions in at least one quality factor, where examples of quality factors can include resolution, color density, frame rate and sampling rate. The particular quality factors associated with a particular file in at least some instances may be dependent upon the type of media file. For example, sampling rate is often associated with an audio file, while frame rate is often associated with a motion picture video file.

In some instances, a particular version of the content might have a higher value for one of the quality factors, but might have a lower value for another one of the quality factors. For example, a particular version of motion picture video content, relative to another version of the same content might have a higher picture resolution, but a lower frame rate. Furthermore, it is possible for some sources to have more than one version of the content, where for example, in the illustrated embodiment, the second peer device 204 has both a copy of the first version 212, and a copy of the second version 214.

Where a particular version has a lower fidelity than the version details associated with the version of the file being requested, a higher fidelity version of the content can be accessed from the same or a different source to supplement the data which is available in the lower fidelity version of the content. Where a particular version has a higher fidelity, then the version details associated with the version of the content being requested, a portion or a subset of the data might be used. In the illustrated embodiment, the second version of the content is being requested.

FIG. 3 illustrates a block diagram 300 of a mapping of usable blocks of different versions of the same content, including a version having a higher quality value and a version having a lower quality value for at least one of the quality factors, such as resolution. Generally, each version of the same content is identified through a searchable identifier contained in the file, such as the header of the file. Each version of the content might additionally include in the file, values for each of quality factors associated with the particular version of the content. For example, such information might similarly be part of a file header, which can be queried by a potential requestor of the content, in order that the requestor can plan the download requests for piecing together a version of the content, which has the desired quality level from the one or more versions having different values for one or more of the quality factors.

While a distribution of blocks are shown relative to each version, the actual distribution for any particular quality level is not necessarily proportional to the amounts illustrated nor is the information associated with each of the different levels of quality necessarily distributed in the file as illustrated. For example, the first version of the content is associated with a version having a picture resolution of 640×480, where the data unique to this version, relative to the two other versions, is shown with a cross hatching. In the particular embodiment illustrated, the amount of additional data is represented as two blocks in addition to the two blocks associated with the other two versions. However, a resolution of 640×480 can represent up to 4× the data relative to the second version of the content, which is identified as having a picture resolution of 320×240, dependent upon the amount of compression. In other words, the coded blocks are intended to identify the presence of additional data, relative to the higher resolution version, which is not present in the lower resolution version.

As shown in FIG. 3, a version of the content corresponding to the second version has been requested. As such, the second version of the content present at one of the peers can generally be used without modification. However, the download can be supplemented with data from each of the lower and higher resolution versions of the content. Generally, most of the data associated with a lower resolution third version of the content can be used, but it needs to by supplemented with additional data from one of the higher resolution versions of the content. Relative to the higher resolution version, a subset of the data can generally be used to produce the desired lower resolution version.

In some instances, a peer containing a higher resolution version might locally create the lower resolution version in support of a particular download. In other instances, it may be possible to receive a mapping of the appropriate data, which would be useful in locally producing the lower resolution version in the target requesting device, and a specific request can then be made to the peer having the higher resolution version, which identifies the specific portions of the higher resolution version, which are desired. An example of an exemplary request structure is illustrated in FIG. 4, which highlights a command structure consistent with the present invention, that enables multiple blocks of data to be identified in a single request, which strings together the descriptors for the multiple blocks in a single command. Each set of four parameters, is generally associated with individual request, which is strung together to form a particular command. The illustrated example, shows N such sets of parameters, each of which identifies the desired data associated with a particular block.

Generally, the exemplary command structure 400 includes parameters identifying the address of the start of the block, labeled first 402, and the address of the end of the block, labeled last 404, as well as the amount of data to grab, labeled size 406, including how often within the defined block to grab the data, labeled step 408, such that a subset of periodically occurring groupings of data can be grabbed from any particular defined data block.

Figure 5:
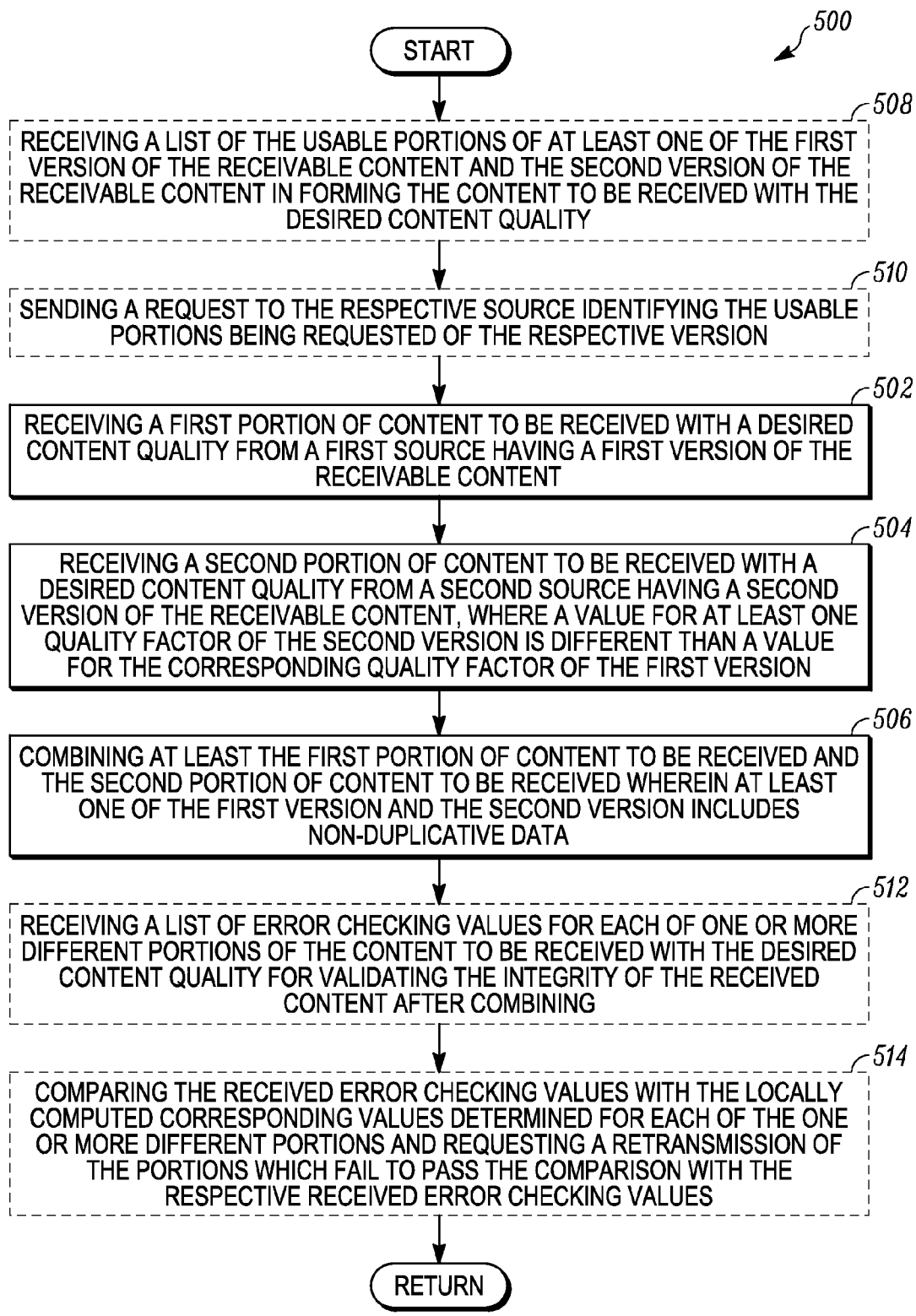
FIG. 5 is a flow diagram of a method in a device for receiving scalable content, in accordance with at least one embodiment of the present invention.

FIG. 5 illustrates a flow diagram of a method 500 in a device for receiving scalable content, in accordance with at least one embodiment of the present invention. The method 500 includes receiving 502 a first portion of content to be received with a desired content quality from a first source having a first version of the receivable content. A second portion of content to be received with a desired content quality is then received 504 from a second source having a second version of the receivable content, where a value for at least one quality factor of the second version of the receivable content is different than a value for the corresponding quality factor of the first version of the receivable content. At least the first portion of content to be received and the second portion of content to be received is then combined 506, wherein at least one of the first version and the second version includes non-duplicative data.

In at least some instances, the method might optionally further include receiving 508 by the device for receiving scalable content a list of the usable portions of at least one of the first version of the receivable content and the second version of the receivable content in forming the content to be received with the desired content quality. Where upon receiving the list of usable portions, a request is sent 510 to the respective source identifying the portions of the particular version stored at the source, that is being requested.

In at least still further instances, the method might further optionally includes receiving 512 by the device for receiving scalable content a list of error checking values for each of one or more different portions of the content to be received with the desired content quality for validating the integrity of the received content after combining. These error checking values could then be used to compare 514 against the locally generated values from the respective portions of the content received. If a mismatch has occurred, the device for receiving scalable content might request that the original source resend the data, or might seek an alternative source for the same section of data. In some instances, the mismatch may be the result of a transmission error. In other instances, the mismatch may be the result of malicious behavior, which has intentionally provided a source of erroneous data.

In at least some embodiments the error checking values are cryptographic hash values, where a cryptographic hash value is derived from taking a predetermined block of data and applying a function that generally returns a fixed size bit string having a determined value. Generally, the function is of a nature such that if there was an accidental or intentional change in the values of any of the data forming the data block from which the cryptographic hash value was determined, a different hash value will be produced. As such, the hash value determined for the received data for the predetermined block of data can be compared against the values determined for the known good copy of the same block of data to help insure that the integrity of the particular block of data has been preserved.

Generally, in order to create the hash values for a file having the desired quality level. A source file having the same quality level needs to supply the values or the values may be derived from a higher quality file, where the data is arranged so as to segregate the data associated with the requested quality level, so that hash values can be determined from the segregated portions. In such an instance it may be beneficial to reorder the data so as to group the data based upon different levels of quality.

Figure 6:
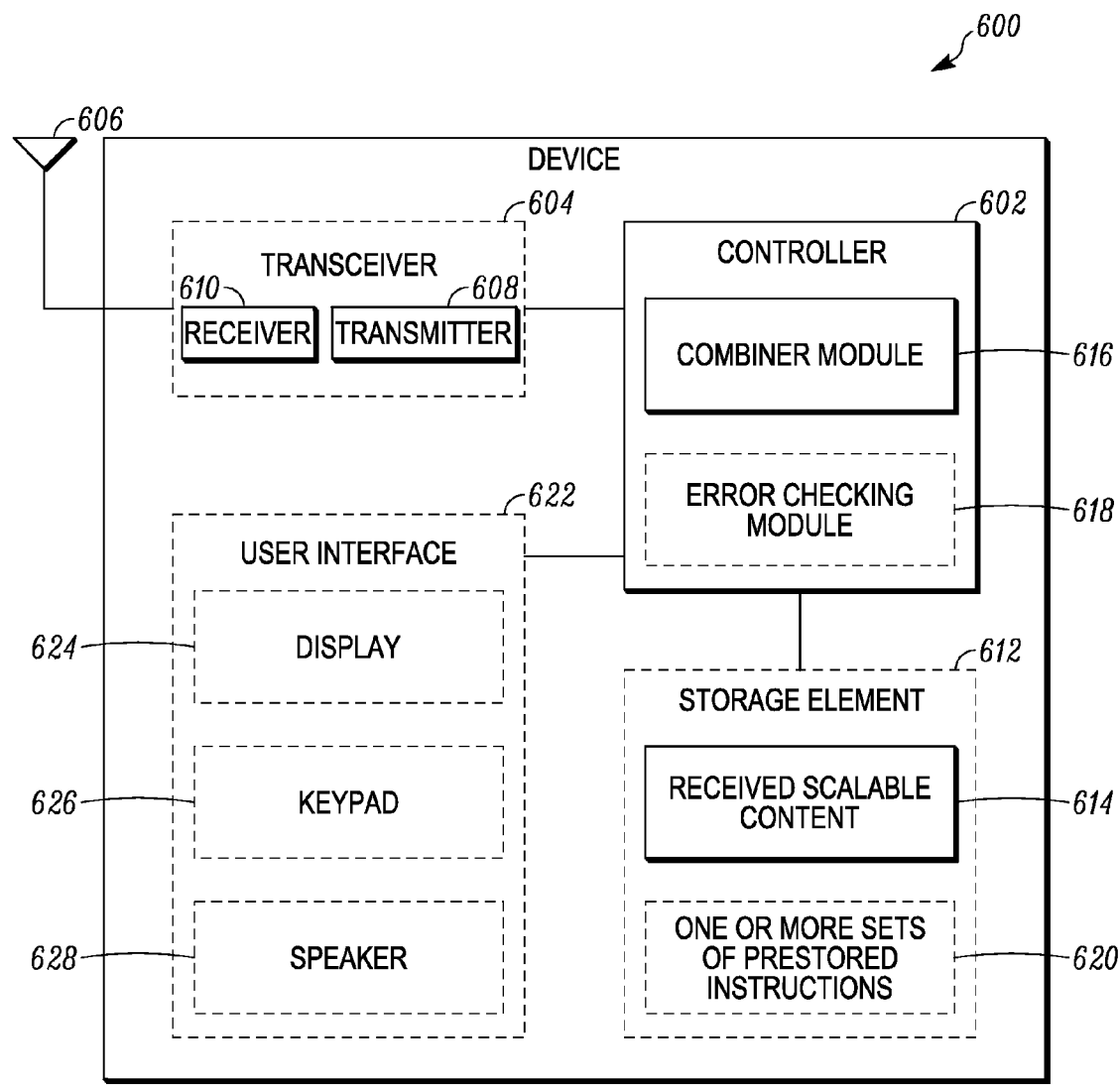
FIG. 6 is a block diagram of a device for receiving scalable content, in accordance with at least a further embodiment of the present invention.

FIG. 6 illustrates a block diagram of a device 600 for receiving scalable content, in accordance with at least one embodiment of the present invention. The device 600 includes a controller 602, and a transceiver 604 coupled to the controller 602. The transceiver 604 facilitates one or more communication connections with the network 102 and/or one or more peer devices 106 and 112, which allows for the receipt and/or transmission of information between the device 600 and the other peer devices of the network 106 and 112. In the illustrated embodiment the connection is managed through a wireless communication connection, however in some instances, the connection can be managed through a wired connection.

The transceiver 604 generally radiates and receives electromagnetic energy via an antenna 606, which is coupled to the transceiver 604. The transceiver 206 generally incorporates both a transmitter 608 and a receiver 610 for supporting transmit and receive functions, thereby enabling bi-directional communication.

In at least some embodiments, the device includes a storage element 612, which can be used to store the received scalable content 614. The controller includes a combine module 616, which is adapted to combine the various portions of the received scalable content 614. In some instances, the controller will further include an error checking module 618.

In at least some embodiments, the communication controller 602 can be implemented at least in part using a microprocessor, which might operate to perform some of the functionality associated with one or more of the associated modules in conjunction with the one or more sets of prestored instructions 620 contained in the storage element 612. The storage element 612 can include one or more forms of volatile and/or non-volatile memory including conventional ROM, EPROM, RAM, or EEPROM, as well as other forms of storage including fixed or removable discs.

While at least some of the functionality associated with one or more of the associated modules can be managed under the direction of one or more sets of prestored instructions, one skilled in the art will readily recognize that the modules can include additional and/or alternative forms, such as sequential state machines and operational logic circuitry, which could be implemented in hardware, software and/or both. To the extent that any portion of the functionality is implemented using hardware elements, the same could be constructed using discrete logic elements, gate array or programmable logic array type structures, and/or could be implemented in a VLSI type structure, without departing from the teachings of the present invention.

In at least some instances, the device 600 further includes a user interface 622, which can include one or more elements for interacting with the user including one or more of a display 624, a keypad 626 and/or a speaker 628. Where present, the user interface elements 622 can be used to render the received content.

In some instances, the content might be rendered to the user as part of the receipt of the content. In such instances, the content is said to be streamed to the user. In other instances, the content might be stored for playback by the user at a time in the future to be selected by the user. Under such circumstances, the content is said to be downloaded.

In at least some instances, the device will be a cellular radio telephone. However one skilled in the art will recognize that the device can alternatively take the form of other types of devices without departing from the teachings of the present invention. Further examples in addition to cellular and/or radio telephones without intending to be an exhaustive list include cordless telephones, paging devices, personal digital assistants, portable computers, pen-based or keyboard-based handheld devices, remote control units, audio players (such as an MP3 player), and video game players, which might similarly received scalable content for use by the user.

Furthermore, because many devices for which scaling of the content is desired may have memory constraints, it may be beneficial to receive and process portions of the file at different times, in order to conserve space within the available memory and/or to avoid overflowing the available memory.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method in a device for receiving scalable content comprising:
    receiving a first portion of content to be received with a desired content quality from a first source having a first version of the receivable content;
    receiving a second portion of content to be received with a desired content quality from a second source having a second version of the receivable content, where a value for at least one quality factor of the second version of the receivable content is different than a value for the corresponding quality factor of the first version of the receivable content;
    combining at least the first portion of content to be received and the second portion of content to be received, wherein at least one of the first version and the second version includes non-duplicative data; and
    receiving by the device for receiving scalable content a list of error checking values for each of one or more different portions of the content to be received with the desired content quality for validating the integrity of the received content after combining.

2. A method in accordance with claim 1, wherein at least one of the first version and the second version comprises non-duplicative data, where the non-duplicative data includes at least one of the first version and the second version having data that is not available from the other one of the at least one of the first version and the second version.

3. A method in accordance with claim 1, wherein the content to be received with a desired content quality is a media file.

4. A method in accordance with claim 3, wherein the media file includes a motion picture video segment.

5. A method in accordance with claim 3, wherein the media file includes a graphical pictorial image.

6. A method in accordance with claim 3, wherein the media file includes an audio segment.

7. A method in accordance with claim 1, wherein the content to be received with a desired content quality is received as part of a download of the content to be received.

8. A method in accordance with claim 1, wherein the content to be received with a desired content quality is received as part of a streaming of the content to be received.

9. A method in accordance with claim 8, wherein the streaming of the content to be received includes a rendering of the content to be received to the user via a user interface of the device proximate to the time of receipt of the content to be received.

10. A method in accordance with claim 1, wherein at least one of the first version of the receivable content and the second version of the receivable content has a value for at least one quality factor, which is different from the desired value of the corresponding quality factor of the content to be received with the desired content quality.

11. A method in accordance with claim 10, wherein the at least one of the first version of the receivable content and the second version of the receivable content, that has a value for at least one quality factor which is different from the desired value of the corresponding quality factor of the content to be received with the desired content quality, has a value which is higher than the desired value of the corresponding quality factor of the content to be received with the desired content quality.

12. A method in accordance with claim 10, wherein the at least one of the first version of the receivable content and the second version of the receivable content, that has a value for at least one quality factor which is different from the desired value of the corresponding quality factor of the content to be received with the desired content quality, has a value which is lower than the desired value of the corresponding quality factor of the content to be received with the desired content quality.

13. A method in accordance with claim 1, wherein the at least one quality factor includes one or more from the list of sampling rate, frame rate, resolution, and color depth.

14. A method in accordance with claim 1, further comprising receiving by the device for receiving scalable content a list of the usable portions of at least one of the first version of the receivable content and the second version of the receivable content in forming the content to be received with the desired content quality.

15. A method in accordance with claim 14, further comprising prior to receiving a respective portion of content to be received with a desired content quality from at least one of the first source and the second source, and after receiving a list of the usable portions of the respective version of the receivable content, sending a request to the respective source identifying the usable portions being requested of the respective version.

16. A method in accordance with claim 15, wherein the request includes a list of multiple different sections of usable portions of the respective version.

17. A device for receiving scalable content in a system including at least a first source having a first version of the receivable content and a second source having a second version of the receivable content, where a value for at least one quality factor of the second version of the receivable content is different than a value for the corresponding quality factor of the first version of the receivable content, said device comprising:
    a receiver for receiving a first portion of content to be received with a desired content quality from the first source, and a second portion of content to be received with a desired content quality from the second source; and
    a controller for combining at least the first portion of content to be received and the second portion of content to be received, wherein at least one of the first version and the second version includes non-duplicative data, said controller including a combine module and an error checking module, where the error checking module is adapted to receive error checking values for each of the first portion of content and the second portion of content for validating the integrity of the received content after combining.

18. A device in accordance with claim 17, further comprising a transmitter for sending a request to the respective source identifying the usable portions being requested of the respective version.

19. A device in accordance with claim 17, wherein the controller includes a scalable codec.

\* \* \* \* \*